(12) United States Patent
Turkelson et al.

(10) Patent No.: US 8,218,890 B2
(45) Date of Patent: Jul. 10, 2012

(54) METHOD AND APPARATUS FOR CROPPING IMAGES

(75) Inventors: Adam Turkelson, Lansdale, PA (US); Ravi Dwivedula, King of Prussia, PA (US)

(73) Assignee: The Neat Company, Philadelphia, PA (US)

( * ) Notice: Subject to any disclaimer, the term of this patent is extended or adjusted under 35 U.S.C. 154(b) by 760 days.

(21) Appl. No.: 12/357,656

(22) Filed: Jan. 22, 2009

(65) Prior Publication Data

US 2009/0185752 A1    Jul. 23, 2009

Related U.S. Application Data

(60) Provisional application No. 61/022,669, filed on Jan. 22, 2008, provisional application No. 61/022,710, filed on Jan. 22, 2008.

(51) Int. Cl.
G06K 9/42 (2006.01)
G06K 9/36 (2006.01)
G06K 9/00 (2006.01)

(52) U.S. Cl. ........................... 382/256; 382/286

(58) Field of Classification Search .................. 382/173, 382/174, 176, 177, 181, 185, 195, 204, 254, 382/256, 260, 286, 289, 290; 358/1.9, 467, 358/527

See application file for complete search history.

(56) References Cited

U.S. PATENT DOCUMENTS

| | | | |
|---|---|---|---|
| 5,052,043 A * | 9/1991 | Gaborski | 382/157 |
| 5,384,864 A * | 1/1995 | Spitz | 382/174 |
| 5,818,976 A | 10/1998 | Pasco et al. | |
| 6,185,314 B1 * | 2/2001 | Crabtree et al. | 382/103 |
| 6,246,794 B1 * | 6/2001 | Kagehiro et al. | 382/185 |
| 6,370,277 B1 | 4/2002 | Borrey et al. | |
| 6,549,680 B1 * | 4/2003 | Revankar | 382/289 |
| 6,763,137 B1 * | 7/2004 | Krtolica | 382/204 |
| 7,069,240 B2 | 6/2006 | Spero et al. | |
| 2002/0159636 A1 | 10/2002 | Lienhart et al. | |
| 2006/0158519 A1 | 7/2006 | Silverbrook | |
| 2007/0013980 A1 | 1/2007 | van Os et al. | |
| 2007/0133880 A1 | 6/2007 | Sun et al. | |
| 2009/0185752 A1 * | 7/2009 | Dwivedula et al. | 382/256 |

OTHER PUBLICATIONS

U.S. Appl. No. 61/022,669, filed Jan. 22, 2008.
U.S. Appl. No. 61/022,710, filed Jan. 22, 2008.

* cited by examiner

Primary Examiner — Amir Alavi
(74) Attorney, Agent, or Firm — Woodcock Washburn LLP

(57) ABSTRACT

The boundaries of a scanned digital document are determined by identifying the largest connected component in the received digital document and assigning the boundaries of the largest connected component as the boundaries of the received digital document or by using a row by row and column by column analysis of the received digital document to identify horizontal and vertical bands in the digital image having pixels with a value opposite to the value of pixels of a background of the received digital document and assigning the horizontal and vertical bands to be the boundaries of the received digital document. These processes may be performed in series or parallel by a processor associated with a scanner that creates the digital document.

28 Claims, 7 Drawing Sheets

Connected
Components

Line by Line

METHOD AND APPARATUS FOR CROPPING IMAGES

CROSS-REFERENCE TO RELATED APPLICATIONS

The present application claims priority to U.S. Provisional Patent Application No. 61/022,669, filed Jan. 22, 2008, and to U.S. Provisional Patent Application No. 61/022,710, filed Jan. 22, 2008. The contents of both of these provisional patent applications are hereby incorporated by reference.

TECHNICAL FIELD

The present invention relates to methods and apparatus for cropping images and, more particularly, to digital image processing systems and methods for detecting the boundaries of a scanned document image.

BACKGROUND OF THE INVENTION

FIG. 1 shows an example of a scanned document image 102. As illustrated, scanned document image 102 may contain large areas of black color 105 around the perimeters of the document 101. Black border 105 typically appears where the scanning sensor was not completely covered by the document 101. It is desirable to adjust the size of the scanned image to correspond to the size of the original document 101 to eliminate or substantially reduce the black border 105 that is scanned. This adjustment is called cropping.

Cropping images of documents scanned using a contact image sensor (CIS) is particularly challenging because these types of sensors sometimes produce scanning defects such as speckles 106a-106e, edge defects 107, and/or white stripes 108 running perpendicular to the direction of the scanning. CIS defects can also take the form of a white area on the top and possibly the bottom of the document. They can also appear as white stripes (i.e., stripes the same color as the background of the scanned document image) running parallel to the direction of the scanning of the document.

As illustrated in FIG. 1, cropping is further complicated by areas of black color 103 (i.e., areas opposite in color to the background of the scanned document) within the document 101. Ordinary cropping methods have problems distinguishing between the black area 111 (which may have white text 109) of the document 101 from the black area 105 that surrounds the document 101. A method and apparatus are desired that allow for accurate cropping of images that have areas of black color, particularly when such CIS defects are present.

SUMMARY OF THE INVENTION

A method and apparatus that addresses the aforementioned needs in the art is provided that determines the boundaries of a received digital document by identifying the largest connected component in the received digital document and assigns the boundaries of the largest connected component as the boundaries of the received digital document. The method also includes determining if the largest connected component has expected boundaries within a confidence range, and if not, using a row by row and column by column analysis of the received digital document to identify horizontal and vertical bands in the digital image having pixels with a value opposite to the value of pixels of a background of the received digital document and assigning the horizontal and vertical bands to be the boundaries of the received digital document. Alternatively, the boundary identifying steps may be processed in parallel whereby the processor is adapted to determine which of the boundaries identified in the respective identifying steps best approximates expected boundaries within a confidence range and assigns the boundaries so identified as the boundaries of the received digital document. The apparatus implementing the method of the invention includes a scanner that scans a document to obtain the received digital document and a processor programmed to implement the boundary identifying processes. The scope of the invention also includes a computer readable storage medium storing instructions for implementing the method of the invention on a processor that reads the instructions from the computer readable storage medium.

In an exemplary embodiment, the step of identifying the largest connected component in the received digital document includes finding the connected components in the image and creating an array of connected components from the found connected components, determining which connected component is the largest, creating a rectangle that encloses the largest connected component, eliminating small connected components from the array, and determining the boundaries of the largest connected component. The method may also include the step of expanding the rectangle to include connected components in the array that are not alone prior to determining the boundaries of the largest connected component.

On the other hand, the row by row and column by column analysis may include the steps of using the horizontal and vertical bands to eliminate horizontal and vertical bands in the digital image having the value of pixels of the background of the received digital document. In an exemplary embodiment, the eliminated horizontal bands are less than about 60 pixels in height and the eliminated vertical bands are less than about 60 pixels in width. The method may also include eliminating horizontal and vertical bands that are within a predetermined distance from a border of the received digital document. Also, the step of assigning the horizontal and vertical bands to be the boundaries of the received digital document may include determining the horizontal bands that are furthest apart and the vertical bands that are furthest apart for pixels having values opposite of the background of the received digital document.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which are presently preferred. It should be understood, however, the embodiments of the present invention are not limited to the precise arrangements and instrumentalities shown.

DETAILED DESCRIPTION OF ILLUSTRATIVE EMBODIMENTS

Exemplary embodiments of the invention will be described in detail below with reference to FIGS. 1-7. Those skilled in the art will appreciate that the description given herein with respect to those figures is for exemplary purposes only and is not intended in any way to limit the scope of the invention. All questions regarding the scope of the invention may be resolved by referring to the appended claims.

Exemplary System

Figure 1:
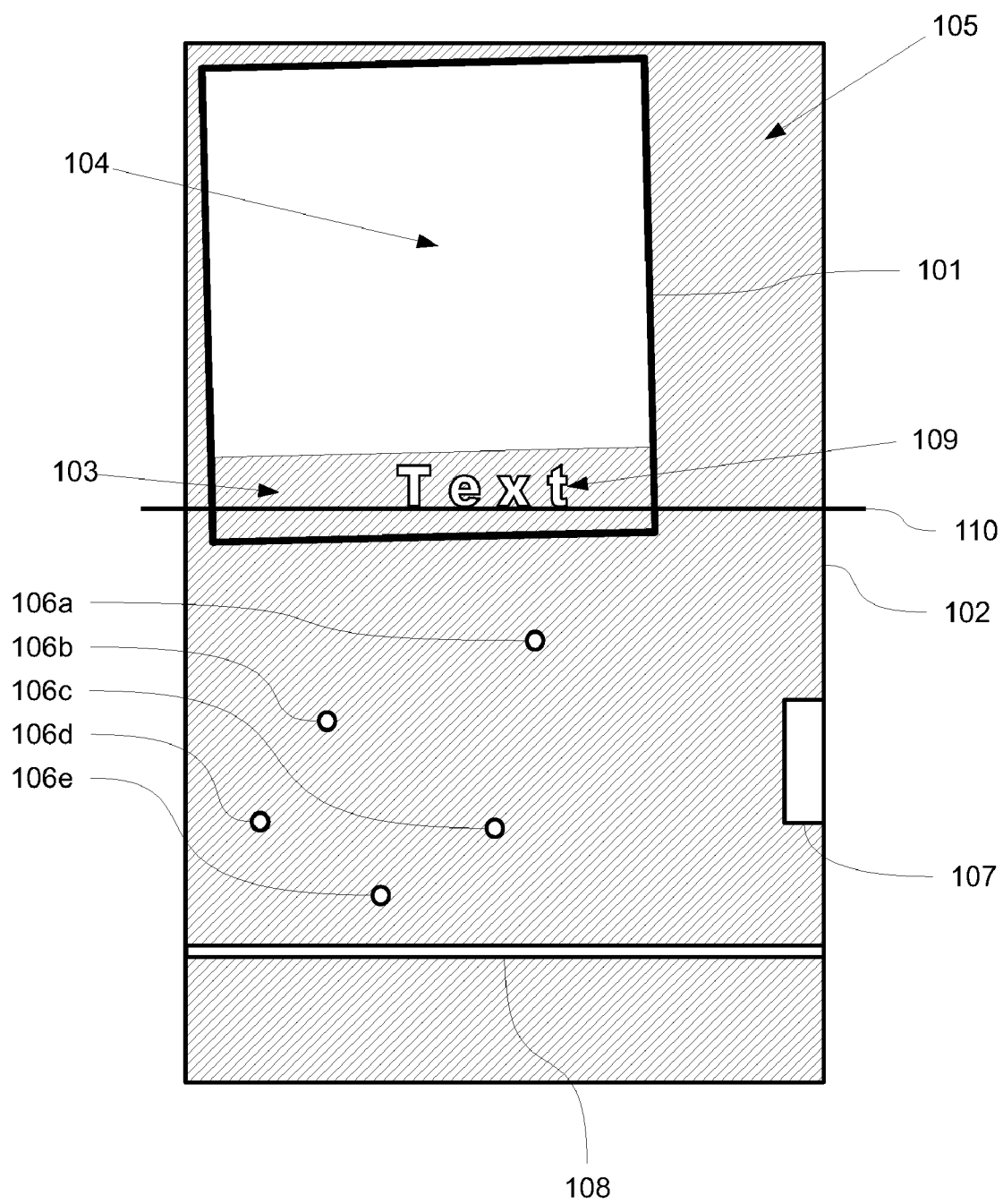
FIG. 1 illustrates a document with CIS defects that is to be cropped using the method and apparatus of the present invention.
Figure 2:
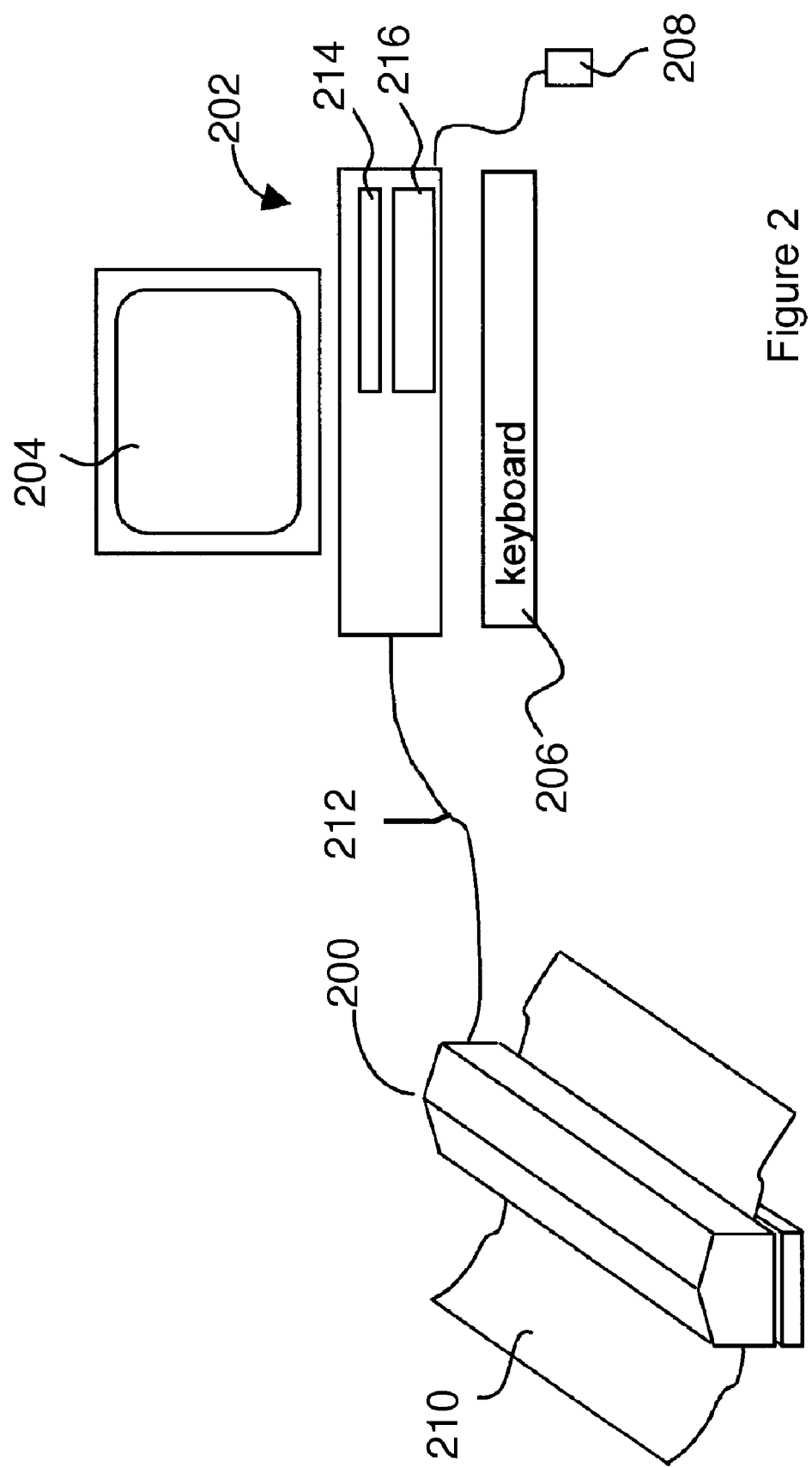
FIG. 2 illustrates a schematic diagram of a portable scanning system that may be adapted to crop digitized images using the techniques of the invention.

FIG. 2 illustrates a schematic diagram of a portable scanning system that may be adapted to scan documents for cropping using the techniques of the invention. As illustrated, sheet-fed scanner 200 is connected through communication cable 212 to a computing device 202, which may be a desktop or laptop computer, for example. Scanner 200 scans a sheet 210, which may be a sheet of paper, a receipt, a business card, or the like, and digitizes the text and graphics thereon in a conventional manner. The scanning result is generally a digital image such as digitized image 102 shown in FIG. 1 that is transferred to the computing device 202 through communications cable 212. The digital image may then be manipulated by a computer program executed by computing device 202. The computer program as executed by computing device 202 may implement various aspects of the claimed method as explained below.

The computing device 202 includes a display monitor 204 on which the scanned image and/or cropped image is displayed to users. Computing device 202 may optionally include a memory slot 214, a disk drive 216 for storing image files and application program files, and a keyboard 206 for providing data input. A mouse 208 is also provided to permit execution of commands by the computing device 202.

In an exemplary embodiment, the computer program executed by the computing device 202 of FIG. 2 analyzes the images received from the scanner 200, converts the images to text, analyzes the text data, extracts expense data, and puts the extracted expense data into an expense report. In another exemplary embodiment, the computer program executed by the computing device 202 of FIG. 2 analyzes business card or other documents images received from the scanner 200, converts the images to text, analyzes the text data, extracts contacts data, and puts the contacts data into a contacts database. An exemplary system for capturing, storing and processing documents, such as receipts and business cards, that have been cropped using the techniques of the invention are described in U.S. Pat. No. 7,069,240. The contents of that patent are hereby incorporated by reference in their entirety.

Cropping Techniques

Figure 3:
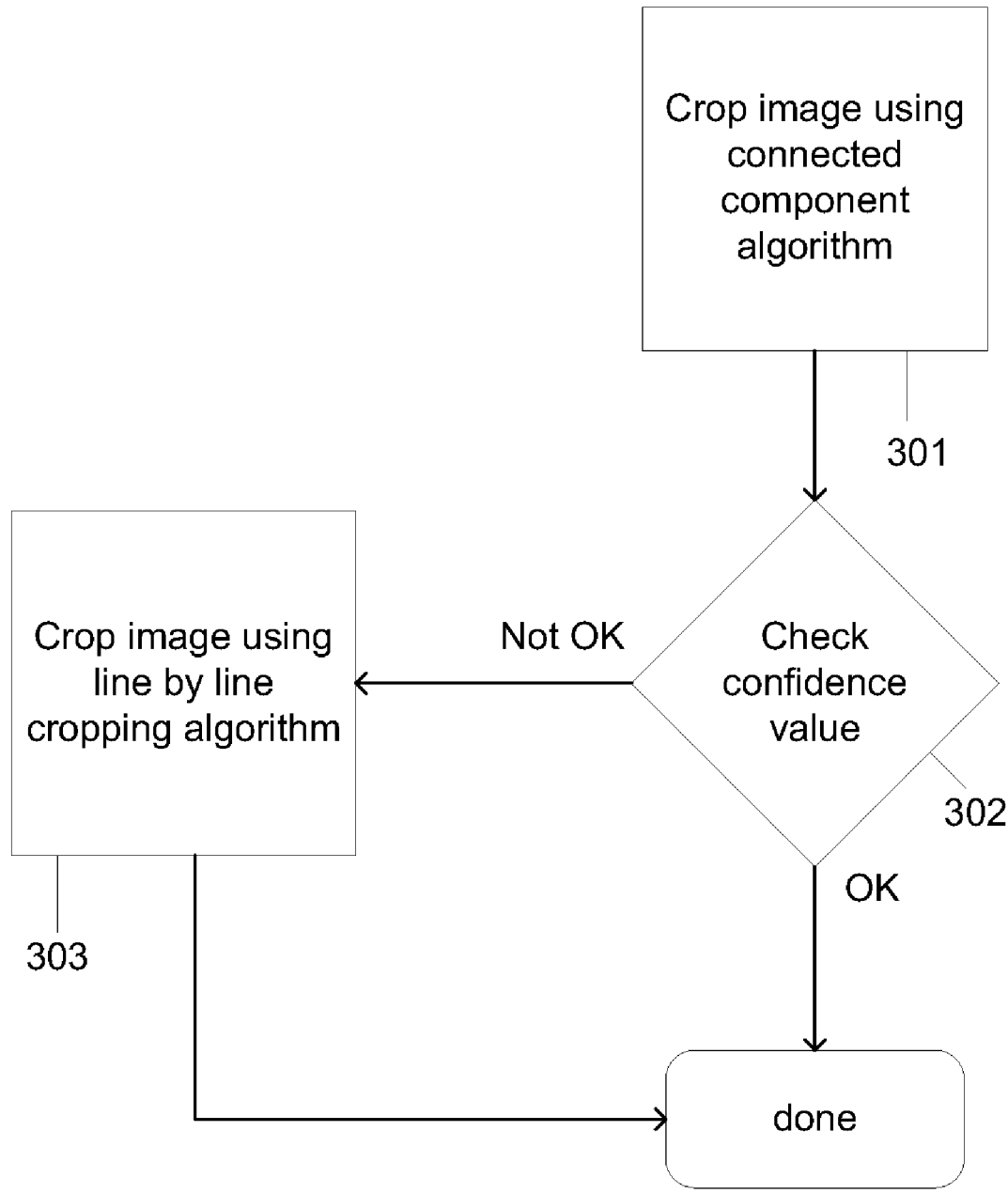
FIG. 3 illustrates an embodiment where an image is first cropped using a connected component algorithm and then cropped using a line by line cropping algorithm if the connected component algorithm does not provide satisfactory results.

FIG. 3 illustrates an embodiment where an image is first cropped using a connected component algorithm and then cropped using a line by line cropping algorithm if the connected component algorithm does not provide satisfactory results. In particular, the scanned digitized image 102 is received by the computing device 202 and processed to crop the digitized image 102 down to the original document 101. In the embodiment of FIG. 3, the cropping is performed as a two stage process. First, the digitized image is cropped using the connected component algorithm 301 described below with respect to FIG. 5. The resulting cropped image is checked at step 302 to determine the confidence level as to whether the resulting image is likely to be the expected image. For example, the paper size of the resulting image can be compared to the expected paper size and/or the resulting image may undergo feature analysis to determine if the resulting image has the features expected to be present in a viable image (i.e., the cropped image has the expected features). If the cropped image has the expected features, then processing ends. However, if the cropped image does not have one or more of the expected features, then the digitized image is cropped using the line by line cropping algorithm 303 described below with respect to FIG. 6. Once the second cropping algorithm 303 has been executed, the resulting cropped image is accepted and processing ends. Those skilled in the art will appreciate that this approach is particularly desirable so long as the connected component algorithm is accurate a high percentage of the time. If this is not the case, the overall processing time will be extended due to the processing of the cropping algorithms in series.

Figure 4:
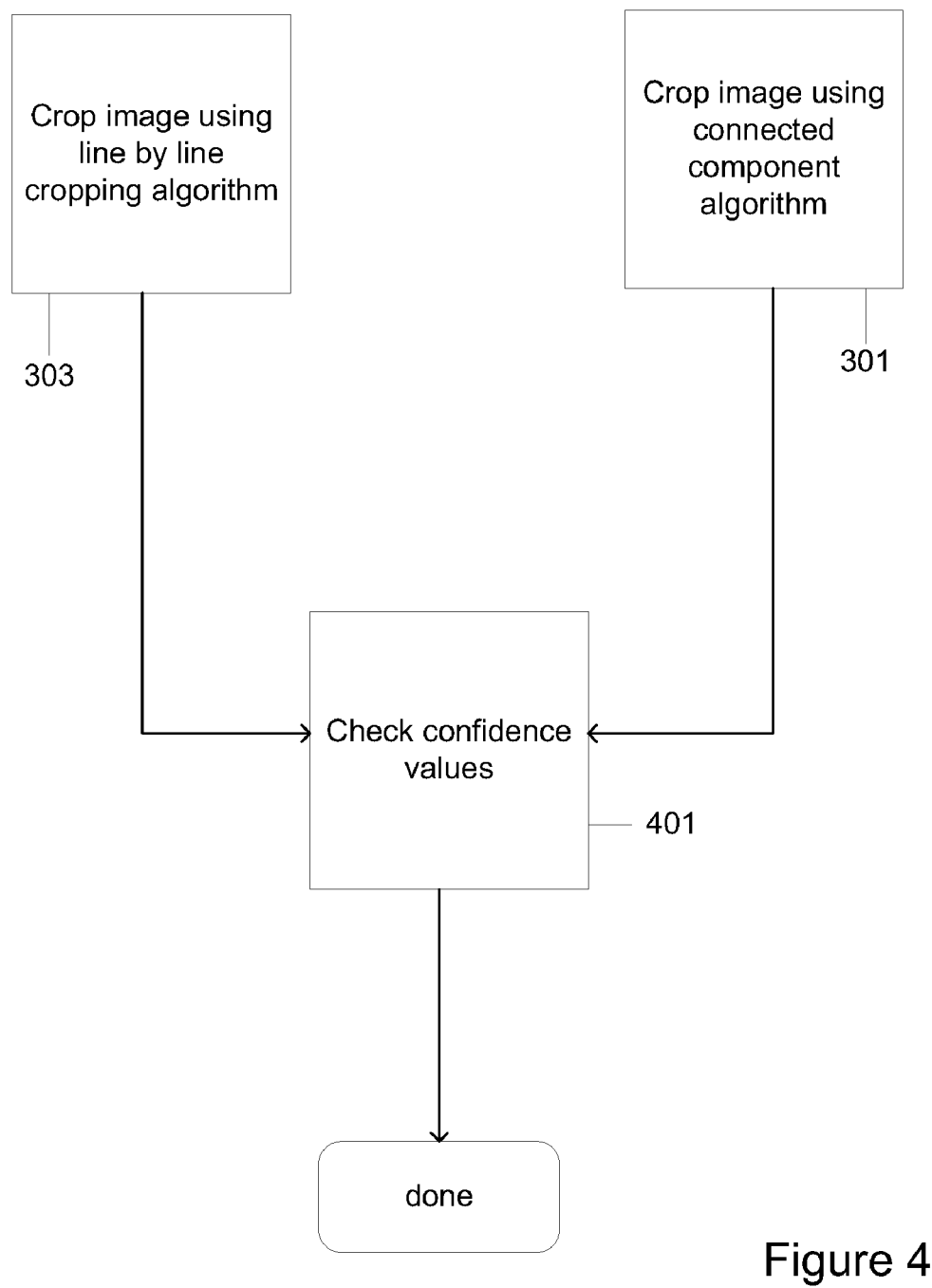
FIG. 4 illustrates an alternative embodiment where an image is simultaneously cropped using both a connected

On the other hand, if sufficient processing power is available to execute the cropping algorithms in parallel, the embodiment of FIG. 4 may be used instead. In the embodiment of FIG. 4, a received digitized image is simultaneously cropped using both a connected component algorithm and a line by line cropping algorithm at steps 301 and 303. However, in the embodiment of FIG. 4, the cropped image is selected at step 401 that provides the most objectively viable result for further processing.

Connected Component Cropping Algorithm

Figure 5:
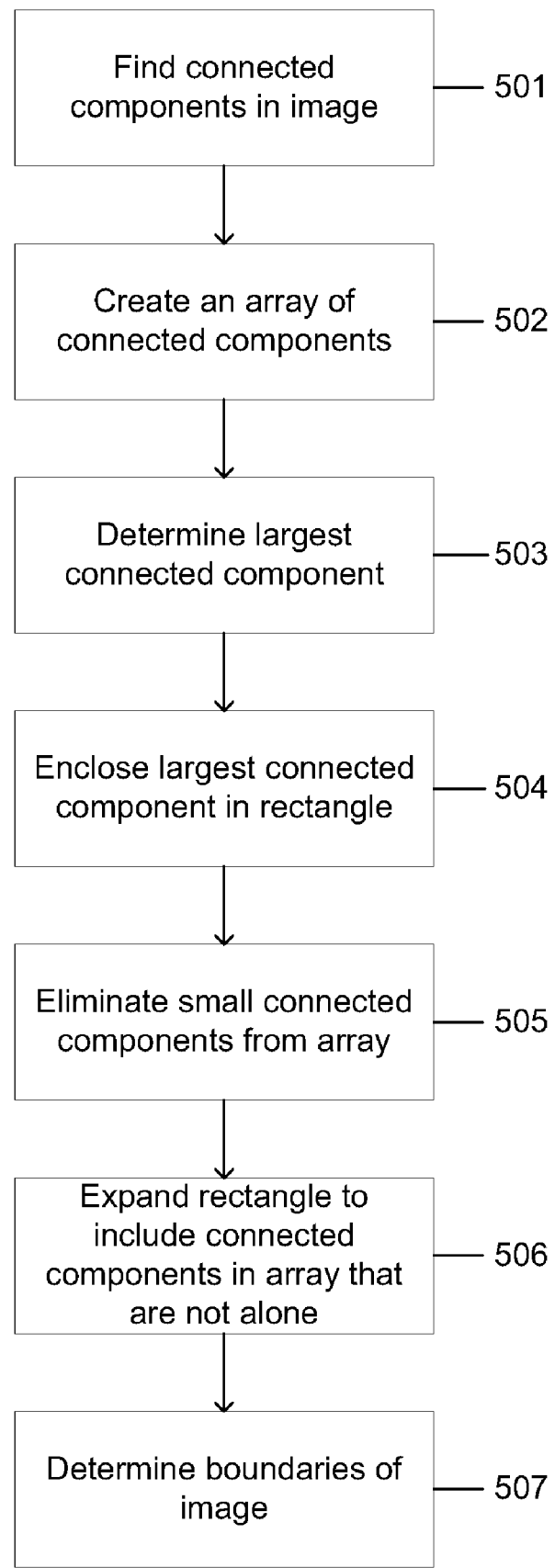
FIG. 5 illustrates an embodiment of a connected component cropping algorithm in accordance with the invention.

FIG. 5 illustrates an embodiment of a connected component cropping algorithm in accordance with the invention. As illustrated, the connected component method for cropping images first finds all the connected components in the image at step 501. Those skilled in the art will appreciated that connected components are regions of connected pixels that have the same or similar values. Algorithms for finding connected components are known to those skilled in the art of image processing. An array cc is created at step 502, and the collection of all the connected components is stored in the array cc. Each element of the cc array is a connected component and it has methods and variables that access the various properties of the connected component. For example, cc[i].width returns the width of the rectangle fully enclosing the connected component. Similarly, cc[i].height returns the height of the rectangle fully enclosing the connected component. cc[i].top, cc[i].bottom, cc[i].left, and cc[i].right return the top, bottom, left and right boundaries of the connected component, respectively.

An exemplary embodiment of the connected component cropping method of the invention as illustrated in FIG. 5 will be described below with reference to pseudocode that may be used to implement each of the claimed features. For example, pseudocode 1 illustrated below binarizes the received image if necessary and implements steps 501 and 502 of FIG. 5. After binarization is complete, the cropping method calls a routine that extracts all the white connected components from the image (step 501). In an exemplary embodiment, a standard threshold binarization technique is used. Namely, all pixels that have a value of less than a threshold (e.g., 40) are translated into pixels with a value of 0, and those pixels with values greater than or equal to the threshold (e.g., 40) are translated into pixels with value of 1. It should be understood that other threshold binarizations are suitable and fall within the scope of the invention. If no connected components are found in the image at step 501, a small rectangle of 8 pixels in size is returned to effectively indicate that no cropping was accomplished. The results are then stored in the array cc at step 502. In the example image displayed in FIG. 1, for example, the following connected components are found: 104, 106*a-e*, 107, 108, and all the letters of the indicia "Text" 109.

Pseudocode 1
if the image is not binarized do binarize the image
extract all the white connected components from the image
store all the connected components in the array cc
if no connected components were found do return a connected component 8 pixels in size Next, at step 503, pseudocode 2, shown below, finds the largest connected component in the array cc. At the end of the execution of pseudocode 2, max_index contains the array index where the largest connected component is located, while max_area contains the area of the rectangle that fully encloses the largest connected component (step 504). On the other hand, max_rect contains the coordinates of the left, top, right, and bottom margins of the largest connected component. At this point the largest white connected component is considered to be the target document. All the areas outside the target document are candidates to be cropped. In the example image of FIG. 1, for example, 104 is the largest connected component, and it is a candidate to be a document.

---
Pseudocode 2
---
for i = 0 to the number of elements in the cc array do
tmp_area = cc[i].height * cc[i].width
if tmp_area > max_area do
   max_index = i
   max_area = tmp_area
   max_rect.set (cc[i].left, cc[i].top, cc[i].right, cc[i].bottom)
---

Pseudocode 2 thus implements steps 503 and 504 of FIG. 5.

Pseudocode 3, shown below, eliminates small connected components from the array cc as in step 505 by filtering out those connected components that are smaller than 4 pixels in height or width. So, in the example image of FIG. 1, since the speckles 106*a-e* are smaller than 4 pixels in diameter they are not included in the new array ncc. In addition, since the area 108 is also less than 4 pixels in height, this area is not a candidate for expanding the target document boundary and is not included in the new array ncc. Thus, the array ncc is a new array of connected components that contains only those connected components that are candidates to expand the boundaries of the target document.

Pseudocode 3 (lines 8-12) ignores all those connected components that are up to 20 pixels in height and rest on the top or bottom margins of the image. Likewise, all connected components that are up to 20 pixels in width and rest on the left or right margins of the image are ignored by pseudocode 3. For example, connected component 107 in FIG. 1 is ignored. Of course, other thresholds besides 20 pixels may also be used in accordance with the invention. Pseudocode 3 (lines 4-5) also preferably ignores the largest connected component so that it is not removed from the new array ncc.

At the end of execution of pseudocode 3 with respect to the image of FIG. 1, the new connected component array (ncc) contains only the connected components of the individual letters of the text area 109. All the other connected components from the cc array are not included in the ncc array.

---
Pseudocode 3
---
w = width of the image
h = height of the image
for i = 0 to the number of elements in the cc array do
  if i = max_index do
    next
  if cc[i].width <= 4 or cc[i].height <= 4 do
    next
  if ((cc[i].left = 0 and cc[i].width <= 20) or
    (cc[i].right = w−1 and cc[i].width <= 20) or
    (cc[i].top = 0 and cc[i].height <=20) or
    (cc[i].bottom = h−1 and cc[i].height <=20)) do
    next
  insert cc[i] into the array ncc
---

Next, in pseudocode 4, shown below, the connected component cropping method tries to determine if any of the remaining connected components are candidates to expand the target document (step 506). In the example image shown in FIG. 1, for example, the document 101 has a band of black area 103 which is not included in the largest connected component 104. The black area 103 has text 109 that is white, so the individual letters of text 109 are candidates to expand the target document areas. The individual letters from the text 109 are included in connected components array ncc.

In pseudocode 4 below the connected component cropping algorithm of the invention considers each of the connected components included in the ncc array to determine if it is appropriate to expand the rectangle of the largest connected component to include components in the array that are not alone (step 506). If the connected component falls outside the area defined by the boundaries of the largest connected component (max_rect) and it is not alone (see pseudocode 5 below), then the max_rect area is expanded to include to the boundary of the connected component. In the example of FIG. 1, the max_rect boundary is expanded to include all the connected components of text area 109. Namely, the bottom boundary of max_rect is moved to line 110.

---
Pseudocode 4
---
for i = 0 to the number of elements in the ncc array
  left = ncc[i].left
  top = ncc[i].top
  right = ncc[i].right
  bottom = ncc[i].bottom
  if bottom > max_rect.bottom and not isAlone(cc, i) do
    max_rect.height = bottom_max_rect.top+1
  if top < max_rect.top and not isAlone(cc, i) do
    max_rect-height += max_rect.top − top
    max_rect.top = top
  if right > max_rect.right and not isAlone(cc, i) do
    max_rect.width = right − max_rect.left + 1
  if left < max_rect.left and not isAlone(cc, i) do
    max_rect.width += max_rect.left − left
    max_rect.left = left
---

Pseudocode 5 describes a method for determining if a given connected component from an array is alone (isAlone (cc, i). This procedure works by first expanding the rectangle of the connected component in question by a predetermined number of pixels (e.g., 600 in the example below), though it should be understood that other thresholds fall within the scope of the present invention. Next, the connected component algorithm cycles through all the connected components in the array to determine if any of the other connected components overlap with the target connected component. If an overlap occurs, the value of containsCounter is increased. If the value of containsCounter is larger than 2, the procedure returns "false," which means that the connected component is not alone. Otherwise, the isAlone procedure returns true, indicating that the target connected component is alone.

---
Pseudocode 5
---
```
function isAlone(cc, i)
    buffer = 600
    boxLeft = MAX(cc[i].left – buffer, 0)
    boxTop = MAX(cc[i].top – buffer, 0)
    boxRight = MIN(cc[i].right + buffer, w)
    boxBottom = MIN(cc[i].bottom + buffer, h)
    for x = 0 to the number of elements in the cc array
        if x = i do
            next
        compareRect.set (cc[x].left, cc[x].top, cc[x].right, cc [x].bottom)
        if containsBox.IntersectsWith(compareRect) do
            containsCounter++
            if containsCounter >=3 do
                return false
    return true
```
---

The resulting expanded rectangle includes the boundaries of the expanded image (step 507). The expanded image is then provided to confidence value check steps 302 or 401 to determine if the resultant image is viable (i.e., has the expected size and features).

Line by Line Cropping Algorithm

Figure 6:
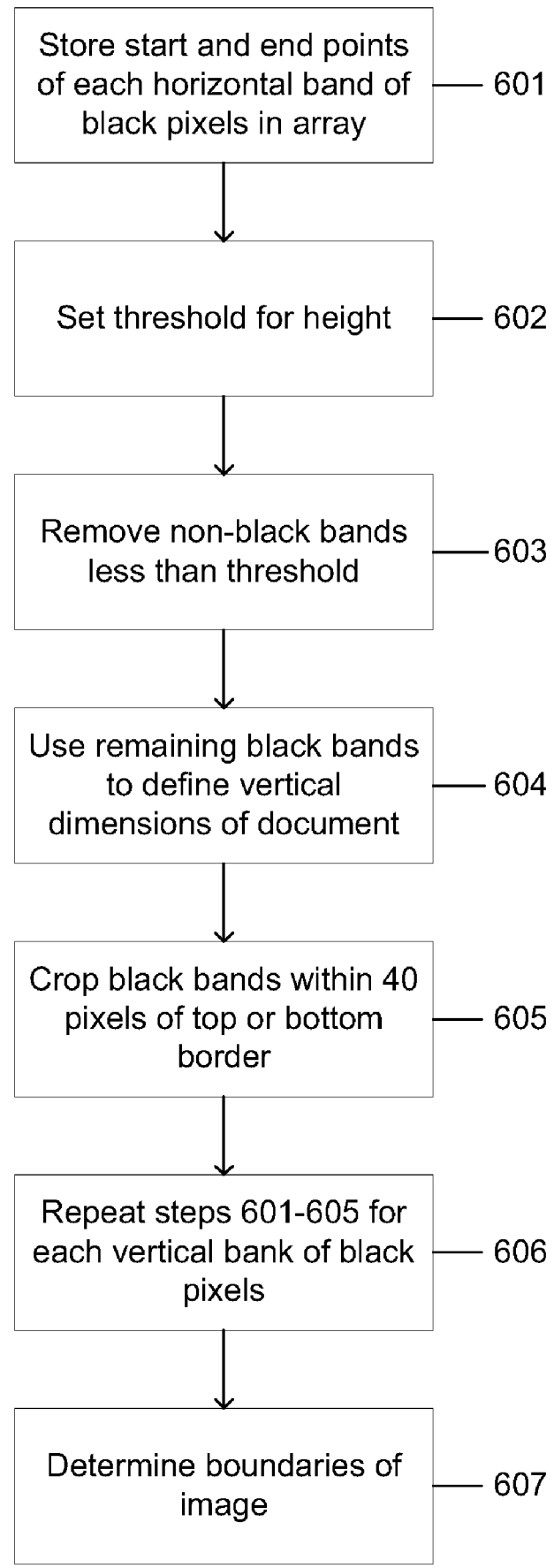
FIG. 6 illustrates an embodiment of a line by line cropping algorithm in accordance with the invention.

FIG. 6 illustrates an embodiment of a line by line cropping algorithm in accordance with the invention. In accordance with the line by line algorithm, the boundary of the document is determined in a few steps. First, the line by line cropping method finds the vertical dimension—the top and the height—of the document. As illustrated at step 601, this is done by analyzing each row of pixels in the image and focusing on finding horizontal bands of the image that are composed of rows that have mostly black pixels (assuming that the background of the document is predominantly white pixels; the reverse is true if the background of the document is predominantly black pixels). A threshold is set at step 602, and these black bands are then used to eliminate all non-black bands that are less than the threshold (e.g., 60 pixels) in height at step 603. This procedure merges and eliminates some of the black bands previously located. The remaining black bands are used to deduce the vertical dimensions of the document at step 604. If any black band being considered for cropping is within, for example, 40 pixels of the top or bottom border, it is slated for cropping at step 605 by modifying the actual document boundaries. The following description and pseudocode explain the details of the line by line cropping method illustrated in FIG. 6.

Finding the Vertical Dimensions of the Document

The start and end points of each horizontal band of black are stored in an array of objects that have start and stop parameters. In the pseudocode below, this array of objects is the st array. Black bands within the document are found using pseudocode 1 below.

---
Pseudocode 1
---
```
i = 0
y1 = 0
while y1 < height of the document do
    if row of pixels at y1 is mostly black then
```
---
-continued
---
Pseudocode 1
---
```
        y2 = y1 + 1
        while line at y2 is black do
            y2 = y2 +1
        st[i].start = y1
        st[i].stop = y2
        y1 = y2
    y1 = y1 + 1
```
---

After the line by line cropping method finds all the black bands in the image, the line by line cropping method needs to decide which of these black bands are candidates to be cropped as borders in an image. As illustrated in steps 602 and 603, the line by line cropping method thus looks through the black areas identified in the previous step to find non-black areas that are less than a preset threshold (e.g., 60 pixels) in height. Alternative embodiments may use different thresholds for the height of the non-black areas. The following pseudocode describes how the method takes out these non-black bands that are narrower than the threshold (e.g., 60 pixels). In understanding pseudocode 2, it is useful to keep in mind that the bands of non-black are defined by st[i].stop and st[i+1].start.

---
Pseudocode 2
---
```
for i = 0 to length of the st array do
    if st[i+1].start – st [i].stop < 60
        st[i].stop = st[i+1].stop
        erase the i+1 element of the st array
```
---

The last step in finding the vertical dimensions of the document involves using the remaining black bands to define the vertical dimensions—top and height—of the document at step 604. The following pseudocode 3 describes how the candidate cropping regions are used to modify the parameters of the document. Basically, if the black band being considered for cropping is within 40 pixels of the top or bottom border it is slated for cropping by modifying the actual document boundaries at step 605.

---
Pseudocode 3
---
```
top = 0
left = 0
height = height of the document
width = width of the document
for i = 0 to length of the st array do
    fp = st[i]
    if (height – fp.stop) < 40
        height = height – fp.stop – fp.start
    else if fp.start < 40
        top = fp.stop
        height = height – fp.stop – fp.start
    else
        height = fp.start
```
---

The horizontal dimensions of the document are then determined by repeating steps 601-605 for each vertical band of black pixels at step 606. The top and bottom boundaries determined in steps 601-605 and the left and right boundaries determined in step 606 are then identified as the boundaries of the image at step 607.

Figure 7:
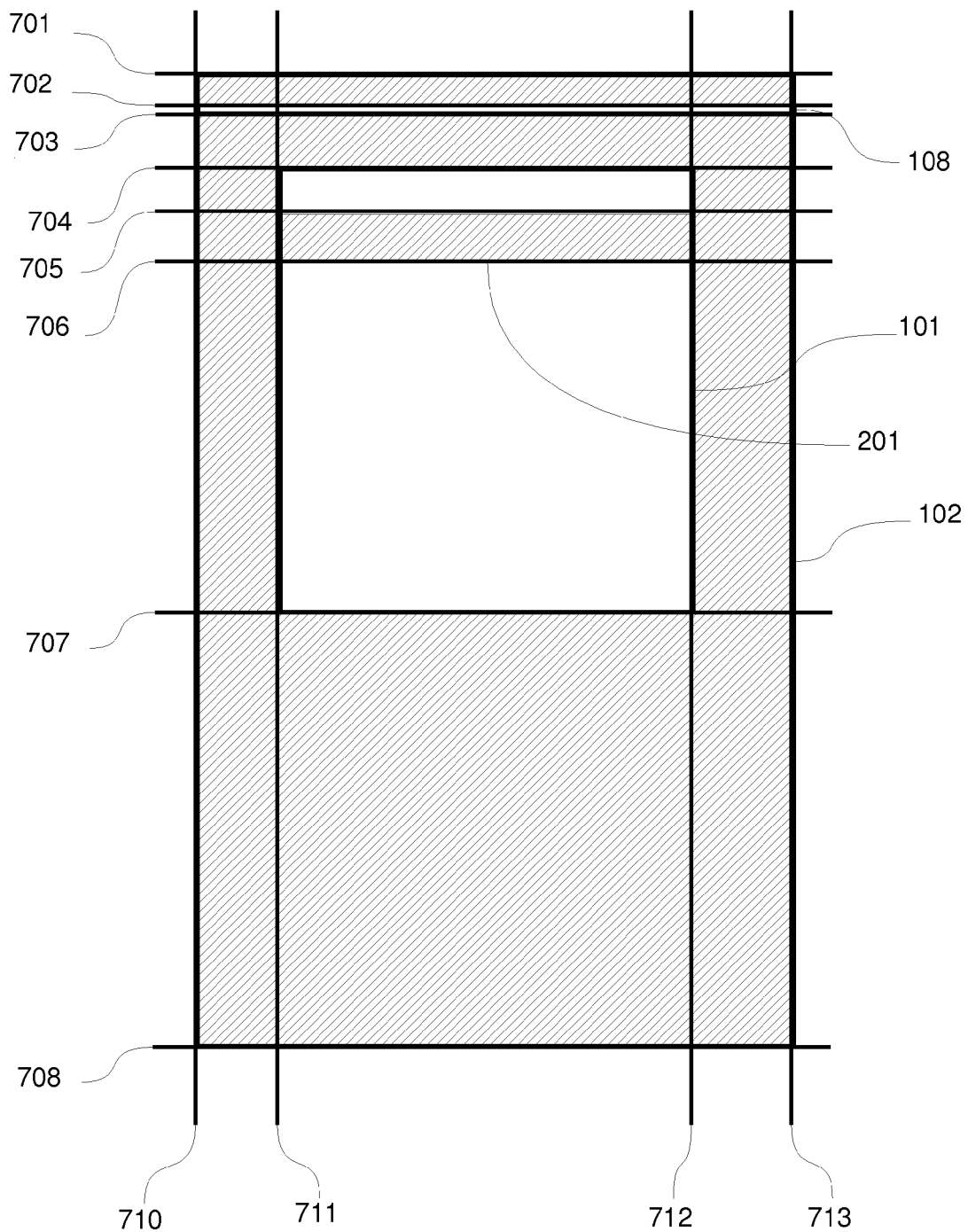
FIG. 7 illustrates an image that is cropped using the line by line algorithm of FIG. 6.

FIG. 7 shows an example image that is to be cropped using the line by line cropping method of FIG. 6. The lines 701-708 represent the boundary lines for the horizontal bands of black. The distance of each of these lines from the top of the document is represented in the following table.

| Line | Pixels from top |
|---|---|
| 701 | 4 |
| 702 | 9 |
| 703 | 12 |
| 704 | 50 |
| 705 | 100 |
| 706 | 110 |
| 707 | 200 |
| 708 | 300 |

These values can be used to illustrate how the line by line method of cropping of FIG. 6 works. For example, the line by line cropping method needs to find all the bands of black. The start and stop points of each band are stored in the st array (step 601). After this part of the method (pseudocode 1) is complete the st array has the following values:
st[0].start=4
st[0].end=9
st[1].start=12
st[1].end=50
st[2].start=100
st[2].end=110
st[3].start=200
st[3].end=300

Next, the bands of white that are less than the threshold (e.g., 60 pixels) in height are eliminated (steps 602-603). After this procedure is complete, the white area between the 9 and 12 pixels is eliminated. The resulting st array has the following values as this part of the line by line cropping method completes (pseudocode 2):
st[0].start=4
st[0].end=50
st[2].start=100
st[2].end=110
st[3].start=200
st[3].end=300

Finally, the vertical dimensions of the document are determined from the remaining black bands at steps 604-605. After this part of the method completes (pseudocode 3), the top and height variables are set top=50 and height=150.

Finding the Horizontal Dimensions of the Document

Finding the horizontal dimensions of the document is analogous to finding the vertical dimensions of the document at steps 601-605 except, in this case, the start and end points of each vertical black band of black are stored in an array st of objects that have start and stop parameters. At step 606, the algorithm for finding the vertical black bands within the document is implemented by software implementing the following pseudocode:

| Pseudocode 4 |
|---|
| i = 0 |
| x1 = 0 |
| clear the st array |
| while x1 < width of the document do |
|    if column of pixels at x1 is black then |
|       x2 = x1 + 1 |
|       while line at x2 is black do |
|          x2 = x2 +1 |
|       st[i].start = x1 |

| -continued |
|---|
| Pseudocode 4 |
| st[i].stop = x2 |
| x1 = x2 |
| x1 = x1 + 1 |

After the line by line cropping method finds all the vertical black bands in the image, the line by line cropping method needs to decide which of these black bands are candidates to be cropped as borders in the image. First the line by line method looks through the black areas identified above to find vertical non-black bands that are less than 60 pixels in width. Alternative embodiments may, of course, use different thresholds for the width of the non-black areas. The following pseudocode describes the way an exemplary embodiment of the method takes out these non-black bands that are narrower than 60 pixels. In understanding the below pseudocode, it is useful to keep in mind that the bands of non-black are defined by st[i].stop and st[i+1].start.

| Pseudocode 5 |
|---|
| for i = 0 to length of the st array do |
|    if st[i+1].start − st[i].stop < 60 |
|       st[i].stop = st[i+1].stop |
|       erase the i+1 element of the st array |

Finally, the following procedure sets the horizontal dimensions—left and width—of the document in the image. The following pseudocode describes how the candidate cropping regions are used to modify the parameters of the document. If the black band being considered for cropping is within 40 pixels of the top or bottom border, it is slated for cropping by modifying the actual document boundaries.

| Pseudocode 6 |
|---|
| left = 0 |
| width = width of the document |
| for i = 0 to length of the st array do |
|    fp = st[i] |
|    if (width − fp.stop) < 40 |
|       width = width − fp.stop − fp.start |
|    else if fp.start < 40 |
|       left = fp.stop |
|       width = width − fp.stop − fp.start |
|    else |
|       width = fp.start |

As noted above, FIG. 7 shows an example image that is to be cropped using the line by line cropping method of FIG. 6. The lines 710-713 represent the boundary lines for the vertical bands of black. The distance of each of these lines from the left of the document is represented in the following table.

| Line | Pixels from left |
|---|---|
| 710 | 0 |
| 711 | 50 |
| 712 | 150 |
| 713 | 200 |

These values can be used to illustrate how the line by line cropping method finds the horizontal dimensions of the document in the image. First the line by line cropping method finds all of the vertical bands of black and the start and stop points of each band are stored in the st array. After this part of the method (pseudocode 4) is complete the st array has the following values:

st[0].start=0
st[0].end=50
st[1].start=150
st[1].end=200

In the next step, any vertical bands of non-black are removed that are narrower than 40 pixels. In this case, there are no vertical bands that are non-black, so there is no change to the st array after this step (pseudocode 5).

Finally, the line by line cropping method calculates the horizontal dimensions of the document from the remaining black bands (step 607). After this part of the line by line cropping method completes (pseudocode 6), the top and height variables are set as left=50 and width=150. For example, the boundaries of the document may be deduced as being in an area between the largest horizontal and vertical spacings of the respective vertical and horizontal lines (e.g., between horizontal lines 706 and 707 and between vertical lines 711 and 712 in FIG. 7).

Various Embodiments

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. As illustrated in FIG. 2, a computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus or machine that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for improving image processing in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the image processing using the methods of the present invention.

Although not required, the invention can be implemented via an operating system, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Those skilled in the art will appreciate that other image processing features besides those specifically described herein may be used with the techniques described herein. Such variations are intended to be included within the scope of the invention as defined by the following claims.

What is claimed:

1. A method for determining the boundaries of a received digital document, comprising:
using a processor to perform the steps of:
identifying the largest connected component in the received digital document and assigning the boundaries of the largest connected component as the boundaries of the received digital document;
determining if the largest connected component has expected boundaries within a confidence range; and
if the largest connected component does not have boundaries within the confidence range, using a row by row and column by column analysis of the received digital document to identify horizontal and vertical bands in the digital image having pixels with a value opposite to the value of pixels of a background of the received digital document and assigning the horizontal and vertical bands to be the boundaries of the received digital document.

2. The method of claim 1, wherein identifying the largest connected component in the received digital document comprises:
finding the connected components in the image and creating an array of connected components from the found connected components;

determining which connected component is the largest;

creating a rectangle that encloses the largest connected component;

eliminating small connected components from the array; and determining the boundaries of the largest connected component.

3. The method of claim 2, further comprising expanding the rectangle to include connected components in the array that are not alone prior to determining the boundaries of the largest connected component.

4. The method of claim 1 wherein the row by row and column by column analysis includes using the horizontal and vertical bands to eliminate horizontal and vertical bands in the digital image having the value of pixels of the background of the received digital document.

5. The method of claim 4 wherein the eliminated horizontal bands are less than about 60 pixels in height and the eliminated vertical bands are less than about 60 pixels in width.

6. The method of claim 4 further comprising eliminating horizontal and vertical bands that are within a predetermined distance from a border of the received digital document.

7. The method of claim 1, wherein assigning the horizontal and vertical bands to be the boundaries of the received digital document comprises determining the horizontal bands that are furthest apart and the vertical bands that are furthest apart for pixels having values opposite of the background of the received digital document.

8. A method for determining the boundaries of a received digital document, comprising:

using a processor to perform the steps of:

identifying the largest connected component in the received digital document and assigning the boundaries of the largest connected component as the boundaries of the received digital document;

identifying, using a row by row and column by column analysis of the received digital document, horizontal and vertical bands in the digital image having pixels with a value opposite to the value of pixels of a background of the received digital document and assigning the horizontal and vertical bands to be the boundaries of the received digital document;

determining which of the boundaries identified in the respective identifying steps best approximates expected boundaries within a confidence range; and assigning the boundaries identified in said determining step as the boundaries of the received digital document.

9. The method of claim 8, wherein identifying the largest connected component in the received digital document comprises:

finding the connected components in the image and creating an array of connected components from the found connected components;

determining which connected component is the largest;

creating a rectangle that encloses the largest connected component;

eliminating small connected components from the array; and determining the boundaries of the largest connected component.

10. The method of claim 9, further comprising expanding the rectangle to include connected components in the array that are not alone prior to determining the boundaries of the largest connected component.

11. The method of claim 8 wherein the row by row and column by column analysis includes using the horizontal and vertical bands to eliminate the horizontal and vertical bands in the digital image having the value of pixels of the background of the received digital document.

12. The method of claim 11 wherein the eliminated horizontal bands are less than about 60 pixels in height and the eliminated vertical bands are less than about 60 pixels in width.

13. The method of claim 11 further comprising eliminating horizontal and vertical bands that are within a predetermined distance from a border of the received digital document.

14. The method of claim 8 wherein the identifying steps are performed in parallel.

15. A non-transitory computer readable storage medium having instructions stored thereon that when processed by a processor cause the processor to implement a method of identifying boundaries of a received digital document by causing said processor to identify a largest connected component in the received digital document by performing the steps of:

finding the connected components in the image and creating an array of connected components from the found connected components;

determining which connected component is the largest;

creating a rectangle that encloses the largest connected component;

eliminating small connected components from the array; and determining the boundaries of the largest connected component as the boundaries of the received digital document.

16. The medium of claim 15, further comprising instructions that cause said processor to expand the rectangle to include connected components in the array that are not alone prior to determining the boundaries of the largest connected component.

17. A non-transitory computer readable storage medium having instructions stored thereon that when processed by a processor cause the processor to implement a method of identifying boundaries of a received digital document by causing said processor to identify vertical and horizontal boundaries of the received digital document by performing the steps of:

performing a the row by row analysis of the received digital document to identify horizontal bands in the digital image having pixels with a value opposite to the value of pixels of a background of the received digital document;

eliminating horizontal bands that are less than a first predetermined number of pixels in height;

assigning the horizontal bands as vertical boundaries of the received digital document that are furthest apart yet border pixels having the value of the background of the received digital document;

performing a the column by column analysis of the received digital document to identify vertical bands in the digital image having pixels with a value opposite to the value of pixels of a background of the received digital document;

eliminating vertical bands that are less than a second predetermined number of pixels in width; and assigning the vertical bands as horizontal boundaries of the received digital document that are furthest apart yet border pixels having the value of the background of the received digital document.

18. The medium of claim 17 wherein the eliminated horizontal bands are less than about 60 pixels in height and the eliminated vertical bands are less than about 60 pixels in width.

19. The medium of claim 17 further comprising eliminating horizontal and vertical bands that are within a predetermined distance from a border of the received digital document.

20. An apparatus adapted to identify the boundaries of a received digital document, comprising:
a scanner that scans a document to obtain the received digital document; and
a processor adapted to identify the largest connected component in the received digital document and to assign the boundaries of the largest connected component as the boundaries of the received digital document and adapted to perform a row by row and column by column analysis of the received digital document to identify horizontal and vertical bands in the digital image having pixels with a value opposite to the value of pixels of a background of the received digital document and to assign the horizontal and vertical bands to be the boundaries of the received digital document.

21. An apparatus as in claim 20, wherein said processor is further adapted to determine if the largest connected component has expected boundaries within a confidence range and, if not, to use the boundaries of the received digital document as determined by the row by row and column by column analysis of the received digital document.

22. An apparatus as in claim 20, wherein said processor is further adapted to determine which of the boundaries identified in the respective identifying steps best approximates expected boundaries within a confidence range and to assign the boundaries so determined as the boundaries of the received digital document.

23. An apparatus as in claim 20, wherein the processor identifies the largest connected component in the received digital document by:
finding the connected components in the image and creating an array of connected components from the found connected components;
determining which connected component is the largest;
creating a rectangle that encloses the largest connected component;
eliminating small connected components from the array; and
determining the boundaries of the largest connected component.

24. An apparatus as in claim 23, wherein the processor further expands the rectangle to include connected components in the array that are not alone prior to determining the boundaries of the largest connected component.

25. An apparatus as in claim 20 wherein the row by row and column by column analysis performed by the processor includes using the horizontal and vertical bands to eliminate the bands in the digital image having the value of pixels of the background of the received digital document.

26. An apparatus as in claim 25 wherein the eliminated horizontal bands are less than about 60 pixels in height and the eliminated vertical bands are less than about 60 pixels in width.

27. An apparatus as in claim 25 wherein the processor further eliminates horizontal and vertical bands that are within a predetermined distance from a border of the received digital document.

28. An apparatus as in claim 20, wherein the processor identifies the largest connected component and identifies the horizontal and vertical bands in parallel.

* * * * *